United States Patent [19]

May et al.

[11] 4,330,341
[45] May 18, 1982

[54] HIGHLY CONCENTRATED FILLER SLURRIES

[75] Inventors: Adolf May, Hofheim am Taunus; Franz J. Voetz, Camberg, both of Fed. Rep. of Germany

[73] Assignee: Hoechst Aktiengesellschaft, Fed. Rep. of Germany

[21] Appl. No.: 230,319

[22] Filed: Feb. 2, 1981

[30] Foreign Application Priority Data

Feb. 8, 1980 [DE] Fed. Rep. of Germany ....... 3004611

[51] Int. Cl.$^3$ ............................................... C09C 3/08
[52] U.S. Cl. ............................................... 106/308 N
[58] Field of Search .................................. 106/308 N

[56] References Cited

U.S. PATENT DOCUMENTS 3,446,569  5/1969  Braun et al. .................... 106/308 N
3,928,276  12/1975  Linden et al. .................. 106/308 N Primary Examiner—James Poer
Attorney, Agent, or Firm—Connolly and Hutz

[57] ABSTRACT

Filler slurries with a content of 0.1 to 5% by weight of a compound of the formula

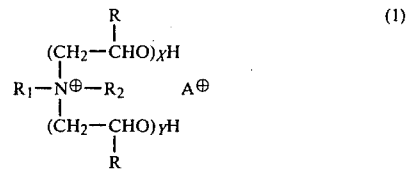

in which R is hydrogen or methyl, $R_1$ is $C_8$–$C_{24}$-alkyl, $C_8$–$C_{24}$-alkenyl or $C_8$–$C_{24}$-alkylphenyl, $R_2$ is hydrogen, $C_1$–$C_4$-alkyl, $C_1$–$C_4$-hydroxyalkyl, $C_2$–$C_4$-epoxyalkyl, benzyl or a group of the formula

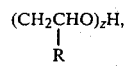

X, Y and Z together are a number from 1 to 20, and A means an anion.

7 Claims, No Drawings

HIGHLY CONCENTRATED FILLER SLURRIES

For years, fillers have been offered in the paint and varnish, paper and adhesives industry not only as powder, but also as aqueous slurries. The slurry form makes the drying process unnecessary and solves the annoying dust problem at the site of operations. An important disadvantage is, however, the relatively low concentration of solid matter of such slurries, since normally filler slurries can only be prepared with a concentration of 50 to 60% of solid matter. Therefore, the energy which is saved because the drying process is not carried out, in general must be compensated by an increased expenditure of transportation. Now it has been found that by addition of oxalkylated fatty ammonium salts the viscosity of such aqueous slurries can be reduced or their concentration 15 of solid matter can be increased.

Subject of the invention are aqueous filler slurries with a content of 0.1 to 5, preferably 0.2 to 2.5, % by weight of a compound of the formula

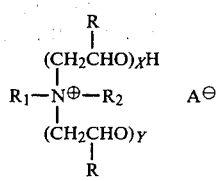

in which R is hydrogen or methyl, $R_1$ is $C_8$–$C_{24}$-, preferably $C_{10}$–$C_{18}$-alkyl, $C_8$–$C_{24}$-, preferably $C_{10}$–$C_{18}$-alkenyl, or $C_8$–$C_{24}$-, preferably $C_{10}$–$C_{18}$-alkylphenyl, $R_2$ is hydrogen, $C_1$–$C_4$-alkyl, $C_1$–$C_4$-hydroxyalkyl, $C_2$–$C_4$-epoxyalkyl, benzyl or a group of the formula

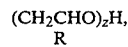

X, Y and Z together are a number of from 1 to 20, preferably 2 to 15, and A means an anion.

The compounds of the abovementioned formula are known and can be obtained by aminolysis of fatty alcohols and subsequent oxalkylation according to known processes. Thus, oxethylated fatty amines are obtained first which then are optionally further oxalkylated and quarternized with acids or alkylation reagents. As anion X there can be used the anions of mineral acids or organic acids, such as hydrochloric, sulfuric, phosphoric, boric, formic, acetic, propionic, lactic, oxalic, malonic, succinic or maleic acid, or the anionic radicals of alkylating agents, for example methosulfate, ether sulfate, dimethophosphate or diethophosphate. The filler slurries according to the invention are prepared by simply stirring all components in water. As solid matter for such slurries may be mentioned, for example, talc, kaolin, calcium carbonate or silicates. In the following there are indicated some filler slurries as well as type and amount of the auxiliaries added in each case and the maximum concentration of the filler slurry which is obtained in the case of the indicated concentration of the auxiliary. The remainder to 100% is water in all cases.

| Filler Talc | max. concentration of the filler |
|---|---|
| without addition | 60% |
| 2% of an oxethylation product from 1 mol of nonylphenol and 4 mols of ethylene oxide | 61,5% |
| 2% of and oxethylation product from 1 mol of nonylphenol and 9 mols of ethylene oxide | 63,5% |
| 2% of Na-alkane sulfate | flocculation |
| 2% of di-alkylmethylammonium chloride | 50% |
| according to the invention: | |
| 1% of compound 1 | 70.6% |
| 2% of compound 1 | 74.4% |
| 2% of compound 2 | 75.2% |
| 1% of compound 3 | 78.3% |
| 2% of compound 4 | 68.0% |
| 1% of compound 5 | 73.8% |
| 2% of compound 6 | 68% |

| Filler plastorite | max. concentration of the filler |
|---|---|
| without addition | 50% |
| 2% of compound 2 | 68.8% |
| 2% of compound 1 | 69.5% |

| Filler dolomite | max. concentration of the filler |
|---|---|
| without addition | 66.7% |
| 0.5% of compound 1 | 78.3% |
| 0.5% of compound 2 | 78.9% |

| Filler calcite | max. concentration of the filler |
|---|---|
| without addition | 65% |
| 0.5% of compound 1 | 76.5% |
| 0.5% of compound 2 | 77% |
| 0.5% of compound 3 | 75.8% |

| Filler calciumsilicate | max. concentration of the filler |
|---|---|
| 2% of compound 7 | 75% | the abovementioned compounds have the following structure:

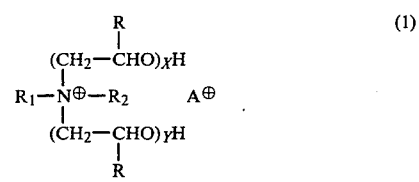

| Compound | $R_1$ | $R_2$ | Sum X + Y | A |
|---|---|---|---|---|
| 1 | $C_{18}$-alkyl | hydroxyethyl | 4 | $Cl^\ominus$ |
| 2 | $C_{16}$–$C_{18}$-alkyl | methyl | 5 | $Cl^\ominus$ |
| 3 | coconut alkyl | hydrogen | 5 | $CH_3COO^\ominus$ |
| 4 | coconut alkyl | hydrogen | 3 | $Cl^\ominus$ |
| 5 | $C_{18}$-alkyl | hydrogen | 8 | $CH_3COO^\ominus$ |
| 6 | coconut alkyl | hydrogen | 3 | $Cl^\ominus$ |
| 7 | cetyl | methyl | 8 | $Cl^\ominus$ |

What is claimed is:

1. Filler slurries with a content of 0.1 to 5% by weight of a compound of the formula $$\begin{array}{c} R \\ | \\ (CH_2-CHO)_xH \\ | \\ R_1-N^\oplus-R_2 \quad A^\oplus \\ | \\ (CH_2-CHO)_yH \\ | \\ R \end{array} \quad (1)$$

in which R is hydrogen or methyl, $R_1$ is $C_8$–$C_{24}$-alkyl, $C_8$–$C_{24}$-alkenyl, or $C_8$–$C_{24}$-alkylphenyl, $R_2$ is hydrogen, $C_1$–$C_4$-alkyl, $C_1$–$C_4$-hydroxyalkyl, $C_2$–$C_4$-epoxyalkyl, benzyl or a group of the formula

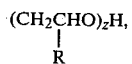

X, Y and Z together are a number from 1 to 20, and A means an anion.

2. Filler slurries according to claim 1 with a content of a compound of formula 1, in which R is hydrogen or methyl, $R_1$ is $C_{10}$–$C_{18}$-alkyl, $C_{10}$–$C_{18}$-alkenyl, or $C_{10}$–$C_{18}$-alkylphenyl, $R_2$ is hydrogen, $C_1$–$C_4$-alkyl, $C_1$–$C_4$-hydroxylalkyl, $C_2$–$C_4$-epoxyalkyl, benzyl or a group of the formula

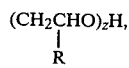

X, Y and Z together are a number from 2 to 15, and A means an anion.

3. Filler slurries according to claim 1, wherein the concentration of solid matter in the slurry is greater than 60%.

4. Filler slurries according to claim 2, wherein the concentration of solid matter in the slurry is greater than 60%.

5. Filler slurries according to claim 3, wherein the slurry is aqueous.

6. Filler slurries according to claim 1, wherein the slurry is aqueous and the remainder of the aqueous slurry, other than any solid matter therein, consists essentially of water.

7. Filler slurries according to claim 6, wherein the concentration of solid matter in the aqueous slurry is greater than 60%.

* * * * *